Dec. 8, 1964    K. E. AUNE    3,160,795
MISSILE LAUNCH DETECTION CIRCUIT
Filed Dec. 27, 1961

INVENTOR.
Kenneth E. Aune
BY
S. J. Rotondi, A. J. Dupont & P. B. Reese III

United States Patent Office 3,160,795
Patented Dec. 8, 1964

3,160,795
MISSILE LAUNCH DETECTION CIRCUIT
Kenneth E. Aune, Burnsville, Minn., assignor, by mesne assignments, to the United States of America as represented by the Secretary of the Army
Filed Dec. 27, 1961, Ser. No. 164,429
1 Claim. (Cl. 317—148.5)

This invention relates to a relay control circuit and more particularly to a novel relay circuit which may be placed in a standby condition without causing erroneous output signals.

The use of transistors, double based diodes, and the like to control relay circuits are well known in the art. However, these prior known circuits have proved unsatisfactory when used in circuits requiring maximum protection against erroneous operations during standby periods. This is particularly true in missile launch detection and actuation circuits which are to indicate to ground personnel if a missile has been properly launched and is functioning correctly. Positive acting relay circuits are also necessary to assure that the missile will remain unarmed and relatively safe before launching, but once properly launched that it will be positively armed in flight. Prior known circuits have been unable to assure the positive action necessary with a simple, inexpensive and positive acting relay circuit.

It is therefore, an object of this invention to provide a new and improved circuit which will assure proper response to the launching of a missile.

Another object of this invention is to provide a relay circuit that does not require an external power source for proper operation after the circuit has been actuated.

Still another object of this invention is to provide means whereby a relay may be energized through a controlled rectifier.

In accordance with this invention, a first relay circuit is connected between the cathode of a semi-conductor, such as a controlled rectifier, and a reference potential such as ground. A second circuit is connected between the anode electrode and a source of operating potential. When the controlled rectifier is in the nonconducting state, a very high impedance is offered to any current flow between the circuits. On the other hand, when the rectifier is in the conducting state, current will readily flow from the operating potential source through the relay circuit to ground. The controlled rectifier may be triggered from its low current conducting state by the application of a current pulse applied from the potential source through a resistor to the control electrode of the rectifier.

Figure 1:
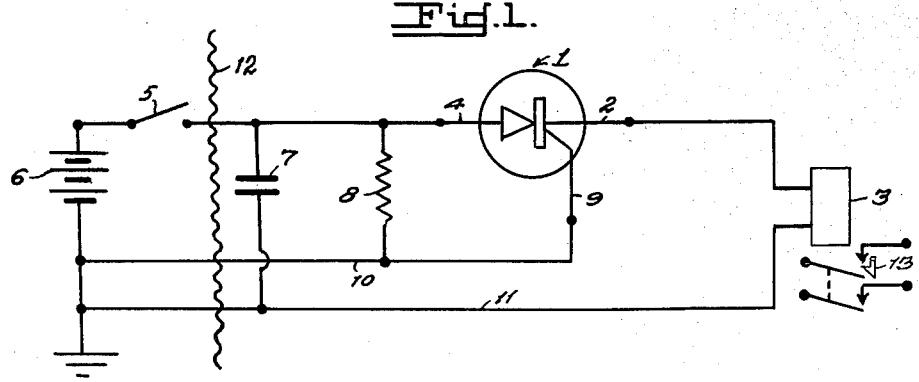
Figure 2:
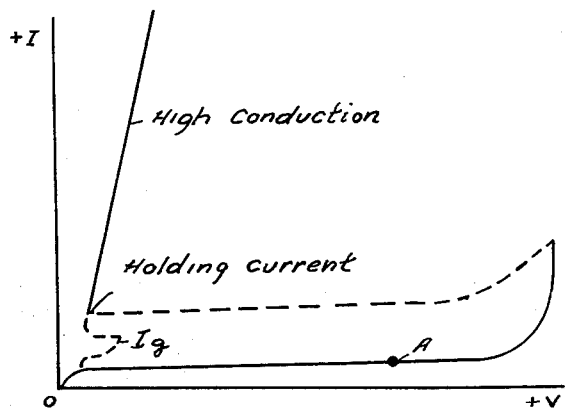

The novel features and uses for this invention will become more apparent by referring to the following disclosure and accompanying drawing in which:

FIGURE 1 shows a relay circuit which is controlled by a controlled rectifier; and FIGURE 2 shows the characteristics of the typical controlled rectifier.

Referring now to the drawings, FIGURE 1 shows a controlled rectifier 1 which may be constructed of silicon. Connected to the cathode 2 of the controlled rectifier is a relay 3 which may be provided with any number of contacts. For purposes of illustration only, the relay has been shown as a simple make type that is latched in the closed position by catch 13. Obviously, other type relays such as the explosion type may be used to control a useful work circuit. The other terminal of the relay circuit is connected by a conductor 11 to a point of reference potential shown as ground. The anode 4 of the rectifier 1 is connected through a switch 5 to a source of positive potential 6. Also connected to the anode of the rectifier is a capacitor 7 and a resistor 8. The capacitor has its second lead connected to ground while the second lead of the resistor is connected to the gate electrode 9 of the controlled rectifier. Connected to the junction point of the resistor and gate electrode is a conductor 10 which connects the junction point to ground. An umbilical cord 12 is provided to sever the connection between the potential source 6 and the common ground from the remainder of the relay circuit upon, for example, the launching of a missile.

The operation of the circuit may be explained in the following manner. With a missile in launching position and the count down begun, the switch 5 is closed thereby applying a potential from source 6 across the capacitor 7. Capacitor 7 charges to the potential value of the source 6 and is now ready to operate the relay circuit upon launching of the missile. The controlled rectifier 1 is not operated upon closing of the switch 5 because the gate electrode 9, which controls the operation of the rectifier, is clamped to ground potential through connector 10. Resistor 8 is of such value that the high side of the capacitor is prevented from being clamped to ground also by the connector 10.

Assuming that the count down is stopped and the missile is not to be fired, the switch 5 will be opened thereby disconnecting the source 6 from the capacitor 7. The capacitor will now discharge through the resistor 8 and conductor 10 to ground. Under these conditions, it can readily be seen that as long as the conductor 10 keeps the control electrode 9 clamped to ground, the controlled rectifier will remain in its non-conductive status thereby preventing the operation of the relay 3.

Assuming now that the count down was completed and the missile launched, the umbilical cord will operate to sever the conductors 10, 11, and the connection between the power source 6 and the capacitor 7. The severing of the conductor 10 unclamps the gate electrode of the controlled rectifier thereby allows the electrode to raise in potential toward the value of the charge carried by the capacitor 7. This raise in potential accompanied by a current surge causes the controlled rectifier 1 to switch into its highly conductive state which in turn causes the capacitor 7 to discharge through the relay 3. This discharge causes the relay to close thereby connecting in circuit any desired device such as a telemetering or arming circuit.

FIGURE 2 illustrates the typical voltage-current characteristics of a silicon controlled rectifier, and the various regions of operation. It can be seen that an increase in the forward voltage does not increase the current flowing through the rectifier until the breakdown or avalanche multiplication region is reached. Once this point is reached, the current through the rectifier increases rapidly until the total current through the device is sufficient to hold the rectifier in a conductive state. If the applied voltage does not exceed the breakdown voltage or a gate pulse is not applied, the rectifier will remain non-conductive.

If a sufficiently high gate current is placed on the gate electrode, the point at which the rectifier becomes highly conductive may be greatly reduced. This characteristic is shown by the dotted line $I_g$, which represents the current applied to the gate electrode when the conductor 10 is severed by the umbilical cord.

The voltage potential of the source 6 is represented by the letter A, which is also the value of the potential stored on the capacitor 7. Once the umbilical cord severs the conductor 10, the gate electrode 9 receives a current surge $I_g$ from the capacitor 7 causing the rectifier to go into the highly conducting state thereby discharging the capacitor through the relay 3.

While I have described my method in conjunction with one arrangement for supplying an operating current to a relay, it is obvious that other arrangements utilizing my method may be employed. It is accordingly desired that my invention be given a broad interpretation commensurate with the scope of the appended claim and the status of my invention within the art.

What is claimed is:

An electronic device including safing means for signaling missile launch detection and actuation circuits as described, comprising, in combination, a silicon-controlled rectifier having anode, cathode and gate elements, a potential source having a first and second terminal, a switch connected between said first terminal and said anode, a relay, a first ground circuit including said relay coupling said cathode element with said second terminal, a capacitor connected from said anode to said first ground circuit, said potential source providing means for charging said capacitor, a second ground circuit coupling said gate element to said second terminal, and a resistor connecting said anode element to said second ground circuit, an umbilical cord, the junction formed by said anode, capacitor and resistor releasably connected to said first terminal by the umbilical cord, the first and second ground circuits releasably connected to said second terminal by the umbilical cord whereby said gate is maintained at ground potential to prevent gating of the silicon-controlled rectifier until disconnected from said potential source by the umbilical cord, said switch opened upon a hold command after said capacitor is charged whereby said capacitor discharges through said resistor and said second ground circuit thereby preventing current flow through said gate element.

References Cited by the Examiner

UNITED STATES PATENTS 3,106,667   10/63   Winchel _____ 317—148.5

FOREIGN PATENTS 68,565   11/44   Norway.

SAMUEL BERNSTEIN, *Primary Examiner.*